United States Patent [19]
Carlton

[11] Patent Number: 5,560,163
[45] Date of Patent: Oct. 1, 1996

[54] DRAINAGE CONNECTOR AND DEVICE TO CONNECT TO DRAINAGE CONNECTOR

[76] Inventor: Douglas C. Carlton, 1115 Heatherwood, Flint, Mich. 48532

[21] Appl. No.: 216,150

[22] Filed: Mar. 22, 1994

Related U.S. Application Data

[63] Continuation-in-part of Ser. No. 198,515, Feb. 18, 1994.
[51] Int. Cl.⁶ ........................................................ E04B 5/36
[52] U.S. Cl. .................... 52/169.5; 52/220.8; 52/699; 285/150; 285/219; 285/221; 285/903
[58] Field of Search ........................... 52/169.5, 220.8, 52/699, 700, 701; 285/150, 219, 221, 903, 189, 64; 411/487

[56] References Cited

U.S. PATENT DOCUMENTS

| | | |
|---|---|---|
| 947,185 | 1/1910 | McBean ............................. 285/219 X |
| 1,864,861 | 6/1932 | Schaller . |
| 2,707,117 | 4/1955 | Fentress et al. . |
| 2,758,612 | 8/1956 | Zaleski . |
| 2,818,636 | 1/1958 | Fentress et al. . |
| 2,893,431 | 7/1959 | Bowditch . |
| 3,318,336 | 5/1967 | Treiber . |
| 3,486,771 | 12/1969 | Conlin ................................. 285/150 X |
| 3,669,473 | 6/1972 | Martin et al. ...................... 285/903 X |
| 3,695,643 | 10/1972 | Schmunk ........................... 285/903 X |
| 3,895,177 | 7/1975 | Muslin . |
| 3,897,090 | 7/1975 | Maroschak ........................ 285/903 X |
| 4,132,264 | 1/1979 | Furlong . |
| 4,274,455 | 6/1981 | Simons . |
| 4,279,190 | 7/1981 | Hummel .................................. 411/487 |
| 4,453,354 | 6/1984 | Harbeke ................................. 52/220.8 |
| 4,688,833 | 8/1987 | Todd .................................... 285/903 X |

Primary Examiner—Carl D. Friedman
Assistant Examiner—Christopher Todd Kent
Attorney, Agent, or Firm—Weintraub DuRoss & Brady

[57] ABSTRACT

A device for interconnecting drainage conduits that have been stabilized while forming building footings includes an annular disk and a cylindrical hub extending outwardly from and about the opening. A stop formed in the hub limits the insertion of the drain tile. A nub on the cylindrical hub prevents lateral movement of the device when the footing forms are removed. Breakaway fasteners are used to hold the device to the footing form. Drainage connectors interconnect with other conduit and connectors connected to other devices to form a network for routing moisture to a desired located.

12 Claims, 2 Drawing Sheets

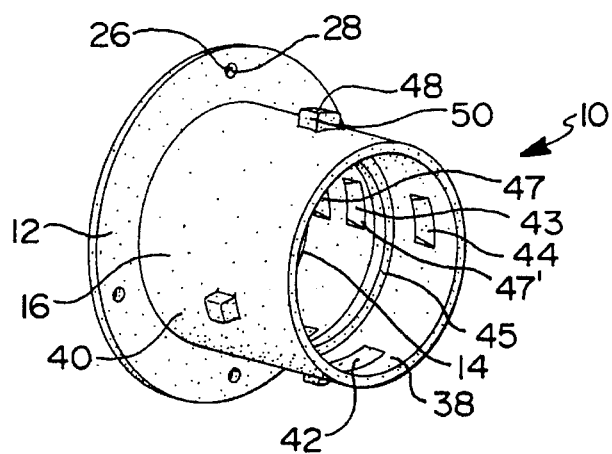
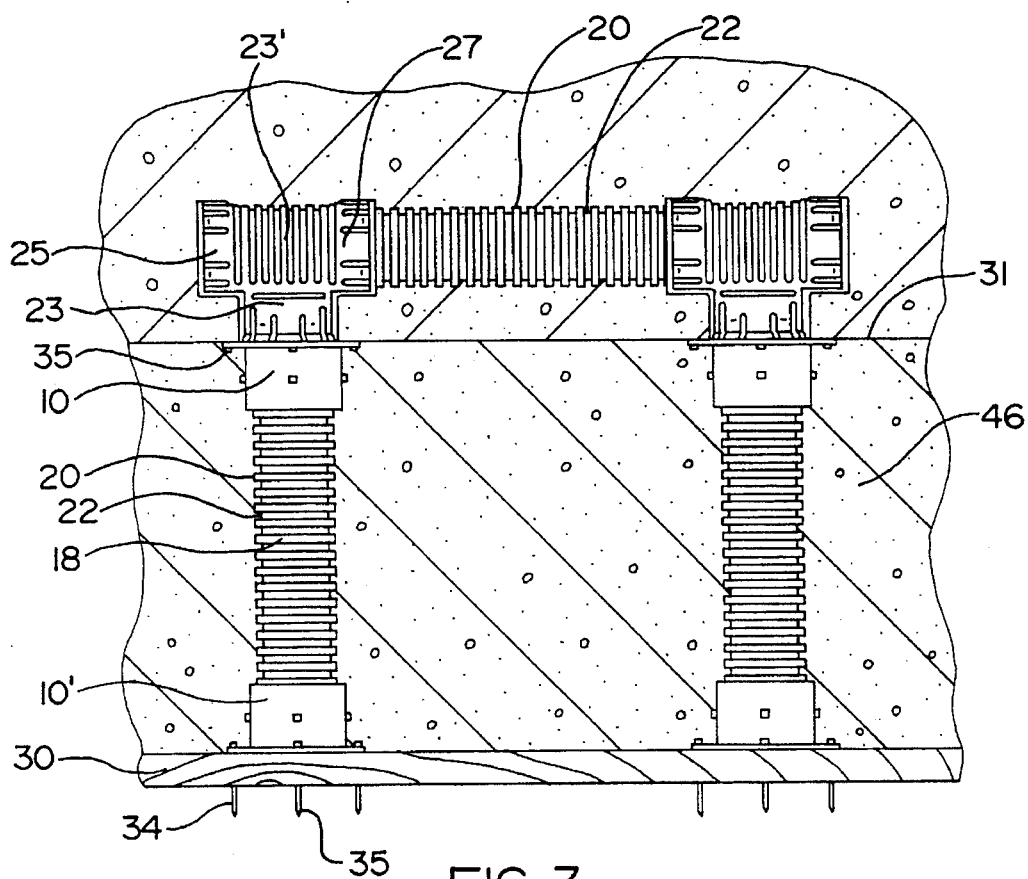

DRAINAGE CONNECTOR AND DEVICE TO CONNECT TO DRAINAGE CONNECTOR

CROSS-REFERENCE TO RELATED APPLICATION

This application is a continuation-in-part application of co-pending U.S. Pat. application Ser. No. 08/198,515, filed Feb. 18, 1994, for "Drainage Conduit", the disclosure of which is hereby incorporated by reference.

BACKGROUND OF THE INVENTION

1. Field of the Invention

The present invention relates to an apparatus or collar for stabilizing drainage conduits during building construction. More particularly, the present invention concerns such apparatus and means for interconnecting drainage conduits utilizing such apparatus.

2. Description of the Relevant Art

As is known to those skilled in the art to which the present invention pertains, there are known methods and devices for draining moisture from the exterior of a building through the building footings to the interior of the building for removal by a sump pump or the like. One known method is to drill through the concrete after it has been poured and has hardened to provide an opening through which communication with the pump can be achieved. This method is not desirable because it is expensive in time and material, particularly in wear on grinding tools.

The most common known method for installing a drainage system uses corrugated drainage conduit or drain tile which is positioned between footing forms (usually made of wood) prior to pouring the cement. Typically, the ends of the conduits are nailed around their periphery to the footing forms and, then, the concrete is poured thereover. This is disadvantageous in that the conduit ends can be crushed by the nailing process and/or the weight of the concrete, thereby radially deforming and/or closing the drainage openings. Additionally, the corrugated conduit can be moved by the weight of the concrete away from the forms thereby allowing concrete into the interior of the corrugated conduit, thereby reducing the benefit.

Further, the weight of the concrete can stretch the conduit and also remove the peripheries from their desired position.

Also, the nails used to secure the conduit usually remain in place after removal of the form. Typically, a connector is manually joined to the conduit. Quite often, the worker scratches or cuts himself or herself on the nails. This in and of itself, creates needless injury.

As noted, ordinarily, the drain tiles are interconnected through suitable connectors to elongated lengths of conduit which are disposed about the periphery of the building. Because of the problems encountered with the pouring of the cement, this, in turn leads to problems with the connectors. For example, if concrete accumulates in the conduit it is difficult to attach the connector thereto. Concomitantly, if the conduit is deformed, then attachment is difficult if not impossible.

Thus, in the above-referred to co-pending application there is disclosed and taught a collar for use in forming footings which prevents the collapse and closure of the ends of the drain tile. While the invention thereof is efficacious it is to be appreciated that there is no ready facility for securing a connector thereto for interconnecting multiple drain conduits. Likewise, the collar of the co-pending application does not enable regulation of the degree of insertion thereinto of either a connector or the drain tile itself.

It is to this to which the present invention is directed.

SUMMARY OF THE INVENTION

In accordance with a first aspect of the present invention there is provided a collar for use with drain tile in forming a footing which comprises:
  (a) an annular disk having a central opening, the disk being adapted to abut against a footing form;
  (b) a cylindrical hub which extends substantially normal to the disk and which is disposed about the opening;
  (c) a stop disposed within the hub for limiting the depth of insertion of a drain tile thereinto; and
  (d) means for mounting a connector to the collar disposed within the hub.

Generally, the means for limiting or stop comprises a radial disk integrally formed with the hub and which projects into the interior of the hub. The disk, thus, defines a wall which limits the depth of insertion of a drain tile into the hub.

The means for mounting, generally, comprises a plurality of protuberances or projections circumferentially disposed about the interior periphery of the hub. The projections cooperate with a leg of a connector, such as a "T"-connector or cross-connector, to enable interconnection of a plurality of drain tiles to form a network thereof.

In an alternate embodiment hereof, the means for mounting comprises first and second sets of projections to enable adjustment of the depth of insertion of the connector.

In a further embodiment hereof, the connector receiving portion of the collar has a thread or groove formed therein which threadingly receives a leg of the connector.

The means for limiting or stop, also, limits the depth or degree of insertion of the connector.

In a second aspect hereof, there is provided a connector, which is adjustably mountable to the collar and for use in connection therewith. The connector has at least one leg having a threaded portion to enable securement to the means for mounting.

For a more complete understanding of the present invention reference is made to the following detailed description and accompanying drawing. In the drawing like reference characters refer to like parts throughout the several views, in which:

BRIEF DESCRIPTION OF DRAWING

FIG. 1 is a perspective view of the drainage conduit mounting device or collar according to the present invention;

FIG. 3 is a partial sectional view of a drainage network using the collar and connector hereof.

DETAILED DESCRIPTION OF THE PREFERRED EMBODIMENT

Figure 2:
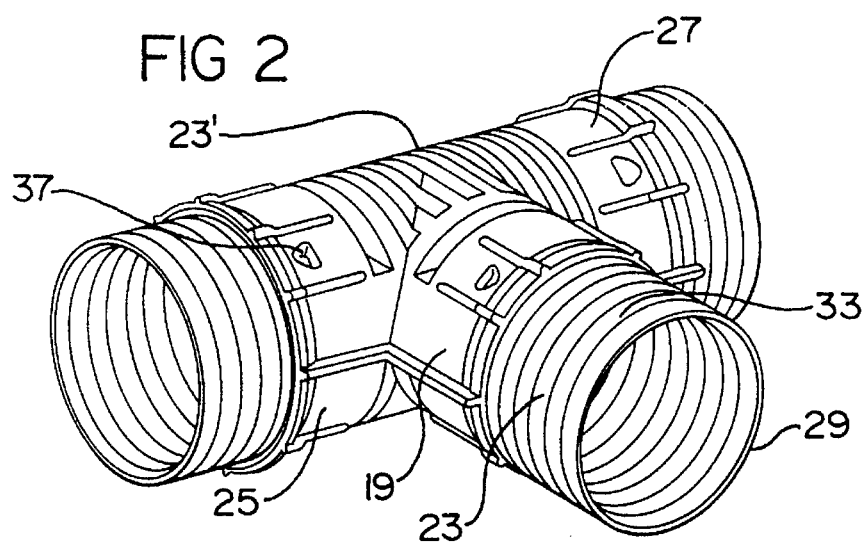
FIG. 2 is a perspective view of a connector according to the present invention.

With reference to the drawing and, in particular, FIGS. 1 and 3, there is depicted therein, a conduit mounting device or collar, generally, denoted at 10 for securing a drainage conduit or drain tile 18 to a footing form 30. In use, and as detailed in the above-referred to co-pending application, a pair of opposed collars 10 are used to secure the conduit 18 between a pair of opposed forms, during footing formation.

The collar 10 hereof, generally, comprises an annular or toroidal disk 12 having a central opening 14 formed therein. A hub or hollow cylindrical portion 16 surrounds the opening 14 and extends substantially normal from the disk 12, as shown.

The disk 12 includes means for securing 26 for securing the device 10 to the form 30. The means 26, generally, comprises at least one aperture 28 through which means for fastening 34, such as a breakaway nail 35 is projected. In other words, a nail can be secured to the form 30 through the aperture 28 to, thus, secure the device 10 thereto. As noted, the preferred means for fastening 34 comprises breakaway nails 35 so the protruding nails can be snapped off when the form 30 is removed, thereby limiting potential injury by punctures or cuts.

However, other means for securing 26, such as screws, staples, adhesives, tacks, etc. (not shown) can be advantageously employed herein.

As best shown in FIG. 1, the hub portion 16 has an interior surface 38 and an exterior surface 40. Means for engaging the conduit 42 is disposed on the interior surface 38. The means for engaging 42 comprises a plurality of protuberances 44 circumferentially disposed on the interior surface 38 of the hub portion 24. The protuberances 44 project into the interior of the cylinder or hub 16, as shown. The protuberances 44 are disposed in such a manner so as to be enable engagement with the threads or corrugations 17 of a drainage conduit 18.

An annular ring 45 projects from the interior surface 38 of the hub portion 16 into the hollow interior thereof. The ring 45 defines a stop or means for limiting the degree or depth of insertion of the drain tile 18 into the hub portion 16. The ring 45 is, preferably, integral and unitary with the hub and is substantially central thereof. The ring 45 defines a wall which precludes insertion of the conduit therepast.

The collar 10, also, comprises means for mounting 43 for mounting a connector 19 thereto. The means for mounting 43, generally, comprises a plurality of protuberances or projections 47 circumferentially disposed about the interior of the hub, as shown. The protuberances 47 are disposed similarly to the protuberances 44 and, accordingly, cooperate with the threading of a connector to mount the connector thereto, as discussed hereinbelow.

It is contemplated that in the practice of the present invention that there be first and second sets of protuberances or projections 47 and 47' circumferentially disposed about the interior of the hub to provide adjustment for the degree of depth of insertion of the connector into the collar 10.

The ring 45 further acts to, thus, limit the depth of insertion of the connector.

As shown in FIG. 2 and as contemplated herein, the present invention, also, includes a connector or conduit 19. The connector 19 is, preferably, a "T"-connector, although other configurations can be used, such as a Y-connector; a right angle connector, etc. Such a connector comprises a first leg 23 which is substantially normal to a second leg 23' defined by arms 25, 27. The legs 23, 23' have hollow interiors to enable fluid communication therebetween.

The legs 23, 23' have protuberances 37 formed thereon to enable threaded engagement with a connecting section of conduit, as discussed subsequently.

Preferably, the leg 23 has a threaded portion section 29 having an exterior thread 33 formed thereon to enable the connector to threadably engage the device 10 via the protuberances 47 on the device 10.

The arms 25, 27 of the leg 23' join in any convenient manner to another connector or length of drain tile or the like to enable formation of a routing network of channels to direct moisture to a desired location. In any event, the connector utilizes at least a first and second interconnecting leg in fluid communication which cooperates to define a "T"-connector or other configured connector.

Figure 4:
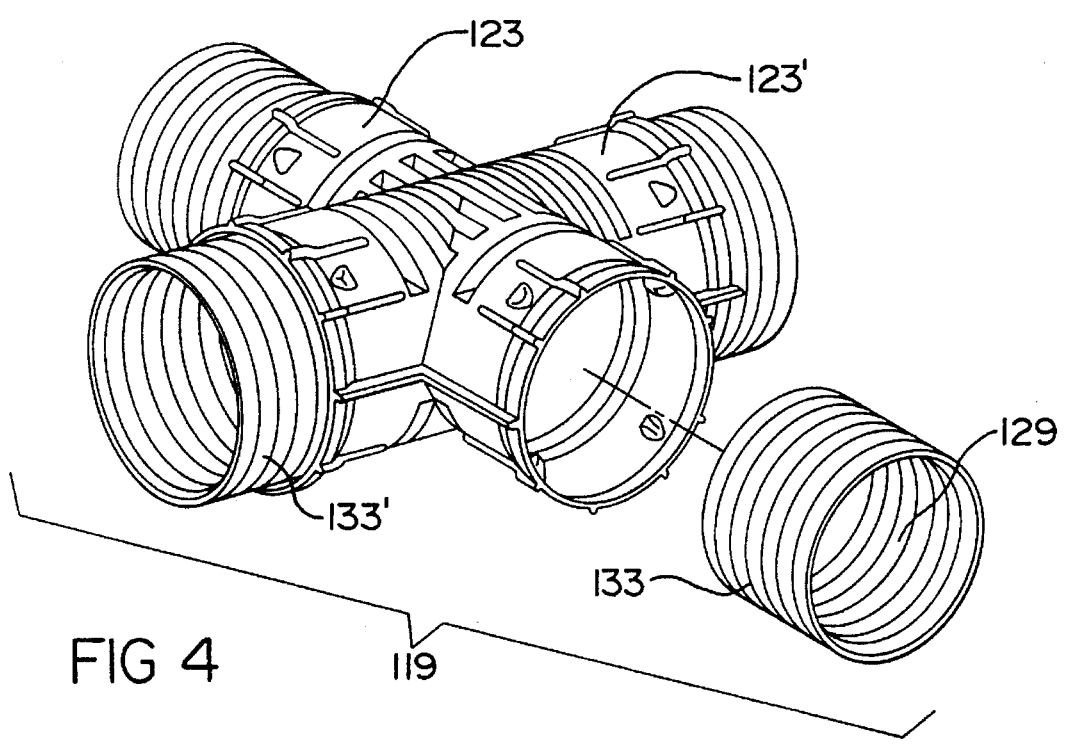
FIG. 4 is a perspective view of an alternate embodiment of the connector hereof.

In FIG. 4, an alternate embodiment of the connector 119 is thereshown. The connector 119 functions similarly to the connector 19, but is a cross-connector having legs 123, 123'. Each leg has an external thread 129, 129' formed thereon. The legs 123, 123' are hollow and in fluid communication. By employing a plurality of connectors 119 an additional or second routing channel can be advantageously incorporated into the drainage network to create an effective drainage system.

As noted hereinabove and as shown in the drawing, the corrugated drainage conduit or drain tile, as well as the leg 23 or 123 of the connector is of the type having annular transverse threads having convolutions 20 or 120 and valleys 22, 122 therebetween.

By inserting an end of the conduit 18 into the interior of the hub 16, the conduit 18 can be threaded into the associated device or collar 10 via the protuberances 44 which seat in the valleys 22. The exterior thread 33, 133 on the leg 23, 123 of the connector 19, 119 is threadably engaged to the other end of the hub 16 in a similar fashion. The exterior thread 33 of the leg 23 is thereby engaged by the protuberances 47. As noted, alternately, the means 42 or 43 for engaging the conduit 18 or the connector 19 can be in either instance or in one instance, a threading on the interior surface 38 of the hub portion 16.

The hub portion 16, also, includes means for retaining 48 for retaining the device 10 in the footing 46. The means 48, generally, comprises at least one hub 50 extending outwardly from the exterior surface 40 of the hub portion 16.

However, other means for retaining 48, such as barbs, fingers, hooks, etc. (not shown) can be advantageously deployed herein.

The nub 50 provides greater surface area for the concrete material to form around. The hub 50 acts as a stop, thusly, preventing lateral dislodgment of the device 10 when the form 30 is removed.

OPERATION

In use, and as shown in FIG. 3, and as known to those skilled in the art, a building footing is traditionally formed by pouring concrete or cement 46 between a pair of spaced apart boards 30, usually referred to as forms. For clarity, the top board is removed with the edge of the footing 31 shown. In deploying the present invention, and as noted hereinabove, a pair of opposed devices 10, 10' are each, respectively, mounted to a board 30, with the conduit 18 engaged therewith and spanning therebetween. The concrete 46 is poured around the conduit 18 where it ultimately hardens. After hardening the board 30 is removed, thus, leaving the devices 10, 10' in position (FIG. 3). The breakaway nails 35 are broken off leaving an essentially planar footing edge 31.

Thereafter, the connectors 23, 23', etc. are threadably engaged with the protuberances on the interior surface 38 of the hub portion 16. The extent of threadable engagement of the connectors is limited by the annular ring 45 on the interior of the hub portion 16.

The arms 25, 25' and 27, 27' of the drainage connectors 19, 19', then, may connect a section of conduit 21, etc., to enable formation of a network.

When completely assembled there is provided a network of interconnected drain tiles which enable moisture to be drained from a building site. The moisture is then removed from the system either statically or dynamically by either draining the moisture away from the foundation through gravity or by pumping by a sump pump as is appropriate (not shown).

Thus, it is to be appreciated by those skilled in the art to which the invention pertains, that the present invention provides an apparatus or device which stabilizes drainage conduits during the formation of building footings, with no radial collapse thereof and which enables formation of an effective drainage system.

Having, thus, described the invention, what is claimed is:

1. A device for use with drainage conduit in forming a building footing, comprising:

an annular disk having a central opening which is abuttable against a footing form;

a hollow cylindrical hub which extends substantially normal to the disk and which is disposed about the opening;

a stop disposed within the hub for limiting the depth of insertion of a drainage conduit thereinto;

a plurality of protuberances circumferentially disposed on the hub and projecting into the interior thereof; and wherein the protuberances are engageable with a connector for mounting the connector to the device.

2. The device of claim 1, wherein the annular disk has at least one aperture formed therein, the at least one aperture defining a means for receiving a means for fastening therethrough, the means for fastening being removably securable to a footing form to secure the device thereto.

3. The device of claim 1 wherein the stop comprises:

an annular ring formed on the hub and projecting into the interior of the cylinder.

4. The device of claim 2, wherein the means for fastening comprises:

at least one breakaway nail.

5. The device of claim 1 further comprising a connector, said connector comprising:

a first hollow leg having a thread formed thereon, the leg being threadably connectable to the hub; and at least one other hollow leg integral with the first leg and in fluid communication therewith.

6. The device of claim 5, wherein the at least one other hollow leg has a thread formed thereon to enable threaded engagement with the hub.

7. The device of claim 5, wherein the first hollow leg intersects the at least one other hollow leg substantially normal thereto to define a T-shaped connector.

8. The device of claim 5, wherein the first hollow leg intersects the at least one other hollow leg and extends therebeyond, the legs cooperating to define a cross-shaped connector.

9. The device of claim a further comprising:

means for retaining the device in position in the footing.

10. The device of claim 9, wherein the means for retaining comprising at least one nub extending outwardly from the cylindrical hub.

11. A drainage network comprising:

a building footing;

a pair of spaced apart devices, according to claim 1, disposed within the building footing;

a drain tile threadably connected at each end thereof to an associated device;

at least one connector threadably engaged with at least one of the devices, the connector comprising a first hollow leg having a thread formed thereon for threaded engagement with the device and a second leg in fluid communication with the first leg, at least one of the connectors being connectable to a second drain tile or another one of said connectors.

12. The device of claim 1 wherein the plurality of protuberances comprises a first set and second set of protuberances radially disposed about and projecting inwardly of the hub wherein the first and second set of protuberances are configured to provide adjustment of the degree of the depth of insertion of a conduit into the device.

* * * * *